United States Patent [19]

Schneider

[11] B 4,001,889

[45] Jan. 4, 1977

[54] MOVING CARRIAGE FOR DISK HEAD POSITIONER

[75] Inventor: Guenter E. Schneider, Concord, Mass.

[73] Assignee: Digital Equipment Corporation, Maynard, Mass.

[22] Filed: June 26, 1974

[21] Appl. No.: 483,247

[44] Published under the second Trial Voluntary Protest Program on April 13, 1976 as document No. B 483,247.

Related U.S. Application Data

[63] Continuation of Ser. No. 295,370, Oct. 5, 1972, abandoned.

[52] U.S. Cl. .................................. 360/104; 310/13; 360/78; 360/97
[51] Int. Cl.² .................... G11B 25/04; G11B 5/54; G11B 17/00; H02K 41/02
[58] Field of Search ............ 360/104, 105, 106, 98, 360/99, 77, 78, 97; 310/16, 12–14

[56] References Cited

UNITED STATES PATENTS

| 3,505,544 | 4/1970 | Helms | 310/13 |
|---|---|---|---|
| 3,544,980 | 12/1970 | Applequist et al. | 360/98 |
| 3,665,433 | 5/1972 | Gillum et al. | 360/106 |
| 3,666,977 | 5/1972 | Helms et al. | 310/13 |
| 3,735,163 | 5/1973 | Dijkstra et al. | 310/13 |
| 3,743,794 | 7/1973 | Miller | 360/106 |

*Primary Examiner*—Alfred H. Eddleman
*Attorney, Agent, or Firm*—Cesari and McKenna

[57] ABSTRACT

A positioner for heads in a rotating disk memory. A carriage in the positioner comprises a central frame, head assembly and coil unit. The central frame moves longitudinally on four wheels which ride in ways in a housing. An end housing portion contains magnetic circuitry to displace the armature and entire carriage longitudinally thereby to position the head unit with respect to tracks on the disk. The integral nature of the carriage enables the center of gravity for the carriage to be centered on the wheels.

10 Claims, 5 Drawing Figures

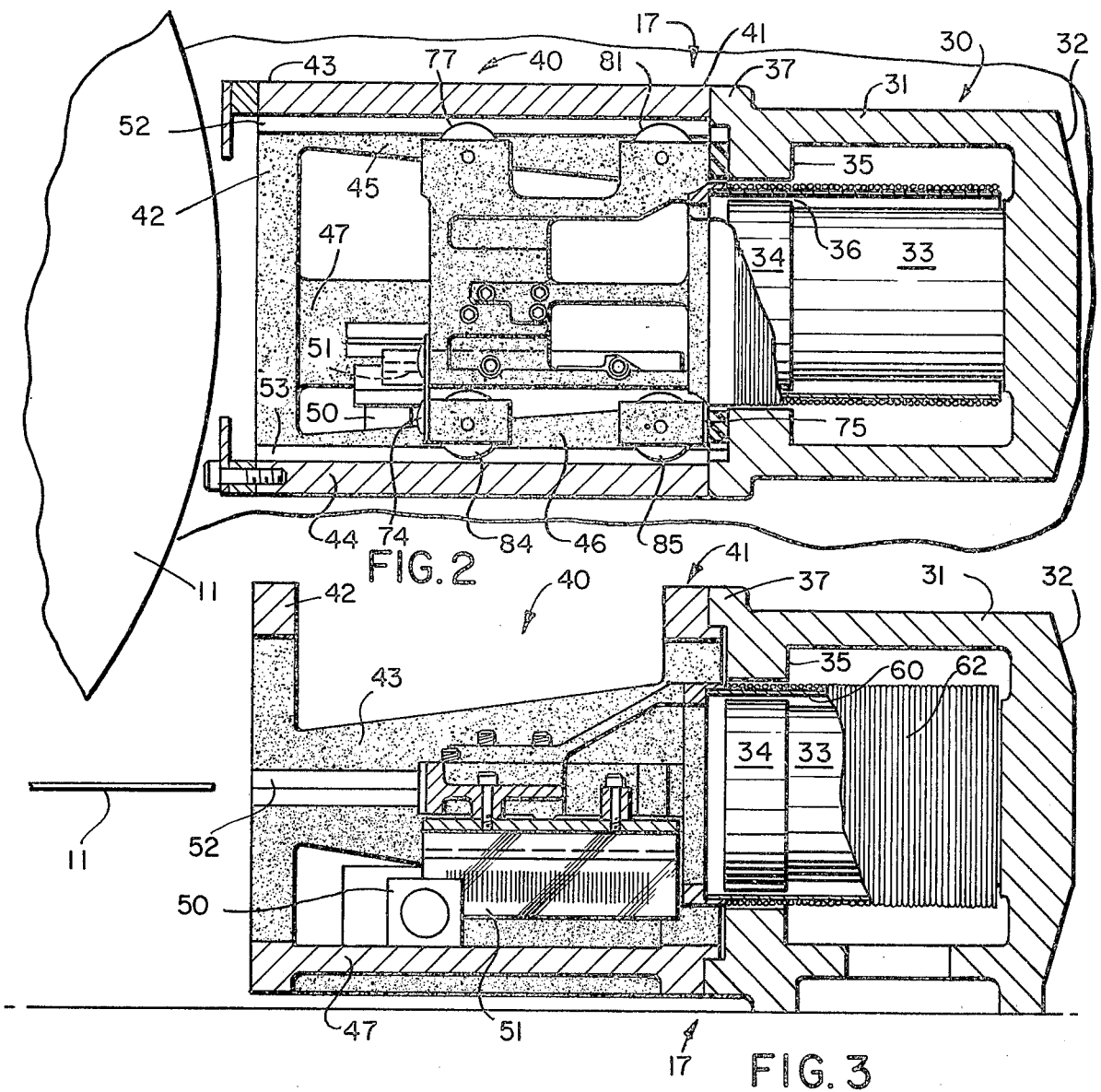
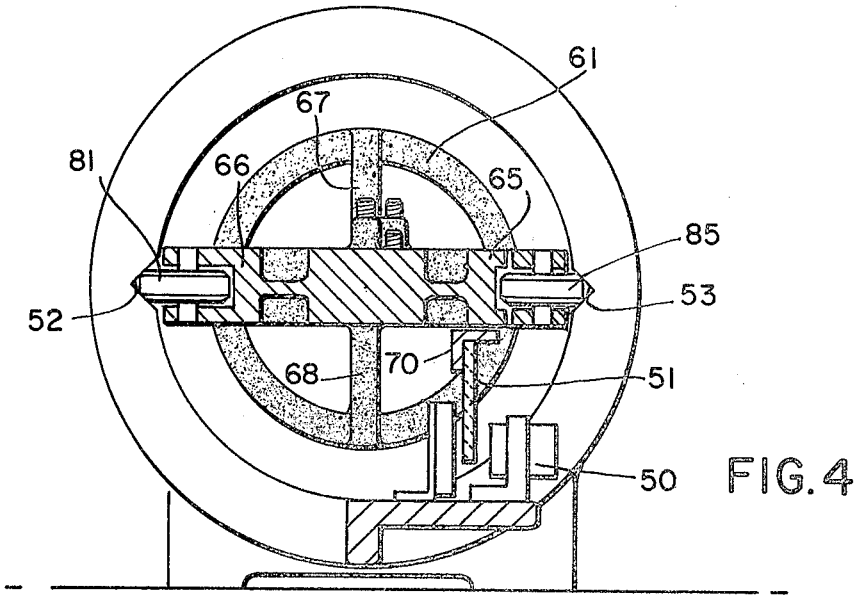

MOVING CARRIAGE FOR DISK HEAD POSITIONER

This is a continuation, of application Ser. No. 295,370 filed Oct. 5, 1972, now abandoned.

BACKGROUND OF THE INVENTION

Rotating disk memories usually comprise one or more disks driven about a vertical axis. Each disk has a plurality of concentric tracks on one or both surfaces from which or to which signals are received or transmitted by means of reading and writing heads. A positioner moves the heads over the surface of the disk, generally radially with respect to the disk, and thereby locates a reading or writing head over a track as required.

Prior positioners comprise a drive unit coupled to a support and a carriage unit mounted on wheels that moves in ways on the support. These prior positioners are subject to two problems. One is wheel wear. Any wheel wear means the carriage can move off its normal line of travel. With spacings of less than 0.010 inch between track centers, any such deviation can cause positioning errors on the disk because the heads are themselves cantilevered on long arms extending from the carriage. The arms magnify any carriage deviation.

It is also difficult to align prior positioners. Whenever a carriage or drive unit is replaced, especially in the field, a technician must first combine the drive and carriage units as a subassembly and align them along a drive axis so the carriage and drive units move freely. Then this subassembly must be mounted and aligned to orientate the heads properly with respect to a disk.

Therefore, it is an object of this invention to provide a more reliable positioner which is less subject to wheel wear.

Another object of this invention is to provide a positioner which simplifies on-site replacement and alignment.

SUMMARY

In accordance with this invention, a positioner comprises as integral housing with one portion having ways, that portion being disposed closely adjacent a disk. The ways support a carriage including an open frame with wheels which ride in the ways, reading and writing heads, supporting cantilevers which position the heads over and under a disk, and a coil assembly which drives the entire assembly. The wheels lie in and define a planar figure. The center of gravity for the carriage lies substantially in the plane and is substantially coincident with the geometric center of the wheels.

Supporting the carriage about its center of gravity greatly reduces the load on the wheels and thereby wheel wear. Acceptable wear rates and operation can be achieved with fewer wheels. Also, the integral nature of this assembly simplifies alignment because locating pins and holes can provide the necessary alignment. This eliminates two-step alignment procedures required in subassemblies of prior art positioners.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 2 is a perspective view of a carriage used in the positioner of FIG. 1;

FIG. 3 is a sectional view taken along line 3—3 of FIG. 2;

FIG. 4 is a sectional view taken along line 4—4 in FIG. 3; and

DESCRIPTION OF AN ILLUSTRATIVE EMBODIMENT

Figure 1:
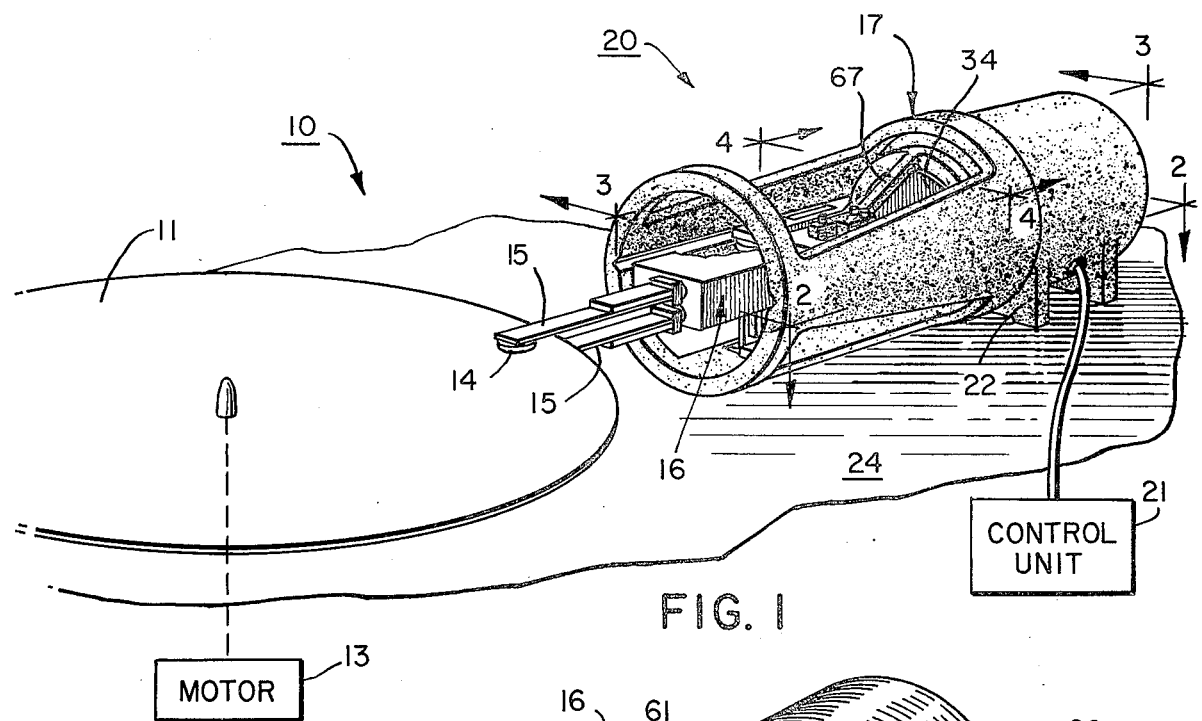
FIG. 1 is a view of a rotating disk memory system with a positioner.

In FIG. 1, a rotating disk memory unit 10 comprises a single disk 11 mounted horizontally on a spindle 12 which a motor 13 rotates past an upper reading and writing head 14. A cantilever 15 suspends the head from a carriage 16 mounted in a housing 17. A lower cantilever 15' supports another reading and writing head below the disk 11. The remaining discussion mentions only the upper cantilever 15 and head 14 because both the upper and lower units are identical.

The carriage 16 and housing 17 constitute a head positioner 20. During operation a control unit 21 receives signals and converts them to DC signals to move the head 14 radially over the disk 11 and thereby position the head at a selected track on the disk in order to read data from or write data onto that track.

As shown in FIG. 1, a mounting portion 22 locates the positioner 20 in holes (not shown) on a main support 24 of the disk unit 10 by conventional means. As the positioner 20 comprises a preassembled unit, the separate components can be constructed to very close tolerances during manufacture. With this construction, complete positioners are interchanged with simple adjustments to orientate the heads over a reference track when the positioner is at a reference position. Hence, other alignment steps required with prior positioners are not necessary. Even when a carriage is substituted, there is merely a requirement that a position transducer be properly aligned.

In FIGS. 2 and 3, a portion 30 of the housing 17 comprises a cylindrical shell 31 with a closed end 32. This closed end 32 supports a magnet 33 at one end. The magnet 33 extends axially through the shell 31. A pole piece 34 is affixed to the other end of the magnet 33. An annular extension 35 on the shell 31 defines an annular air gap 36 with the pole piece 34 in a central portion of the housing 17.

The housing 17 also includes a cut out cylindrical guide 40 between the portion 30 and the disk 11. The guide 40 is affixed to a flange portion 37 on the shell at one end 41. At its other end, the guide 40 has a rim 42 adjacent to the disk 11 and spaced from the end 41 by side struts 43 and 44. The struts include integral longitudinal stiffeners 45 and 46. A support 47 (FIGS. 3 and 4) extending between the end 41 and rim 42 and spaced from the struts 43 and 44 carries a stationary member 50 in operative association with a moving member 51 in a position sensing transducer.

The struts 43 and 44 contain ways 52 and 53 which are specifically shown as longitudinal V-shaped grooves (FIGS. 3 and 4).

Figure 5:
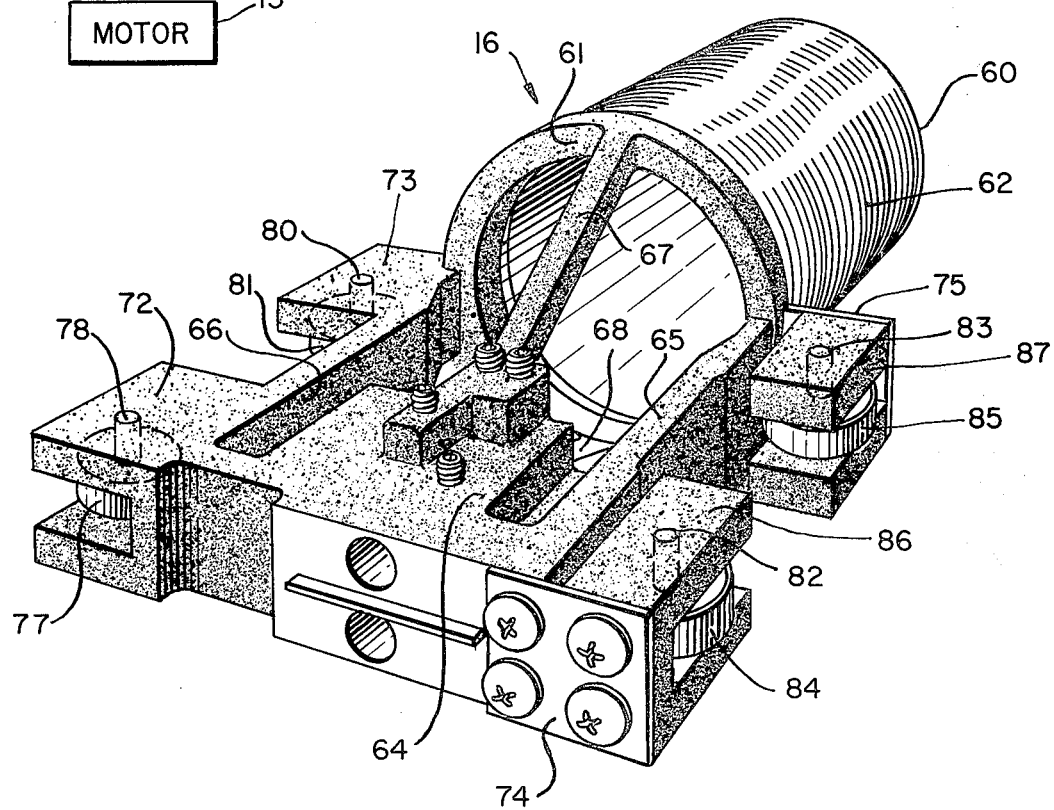
FIG. 5 is a section of the positioner taken along line 5—5 in FIG. 1.

The structure of the carriage 16 is more clearly seen in FIG. 5. A coil unit includes a cylindrical support 60 extending from a ring 61 for carrying a voice coil 62.

The voice coil 62 and the support 60 pass through the air gap 36 (FIGS. 2 and 3). Hence, if an electric current passes through the coil 62, the coil applies to the carriage a force whose magnitude and direction depend upon the current magnitude and direction respectively. This force causes the carriage 16 to move in the ways 52 and 53. The control unit 21 (FIG. 1) controls the current which energizes the coil 62 and connects to the coil by conventional means.

As best shown in FIGS. 4 and 5, the carriage 16 also comprises a central horizontal plate 64 supported from the ring 61 by side struts 65 and 66 and upper and lower struts 67 and 68. A bracket 70 suspended from the side strut 65 carries the moving portion 51 of the position transducer.

Still referring to FIGS. 4 and 5, four wheels support the carriage in the ways 52 and 53. Specifically, fork-like extensions 86 and 87 project laterally from the strut 65. Each of these extensions carry a wheel assembly comprising a wheel, axle, and bearings. In the following discussion, a designated axle identifies both the axle and its bearings. Axles 82 and 83 carried by these extensions support wheels 84 and 85 for rotation in a horizontal plane. On the other side of the carriage 16 extensions 72 and 73 support wheels 77 and 81 by means of axles 78 and 80. The extensions 86 and 87 are attached to the strut 65 by means of flexure members 74 and 75 or are affixed to the strut 66 by some other means for exerting a mechanical bias.

As best seen in FIGS. 2 and 4, the wheels ride in the ways 52 and 53. The ways are sufficiently confining to force the wheels 84 and 85 inwardly. The resulting reaction forces exerted by the flexure members 74 and 75 maintain the wheels securely in their respective ways. The V-shaped cross sections of the ways cause the wheels to center in the ways so as to accurately maintain the vertical position of the carriage 16. Moreover, with the rigidly mounted wheels 77 and 81 thus forced against the way 52, the way 52 serves as an accurate reference for lateral positioning of the carriage 16 and the head 14 mounted thereon.

With the foregoing construction, the symmetries associated with the carriage 16 and the components moved therewith provide an ideal location for the center of gravity of the moving assemblage. Specifically, it is located in the horizontal plane defined by the ways 52 and 53 and is midway between the wheels. That is, the center of gravity is located midway between the guides which contain the wheels and in the plane of the guides. As a result, the load on the wheels is substantially equal so all the wheels are identical. This simplifies equal so all the wheels are identical. This simplifies construction.

Further economies are also obtained because the number of wheels can be reduced by one-half over prior positioners. Looking at axle 82 and wheel 84 by way of example, all reaction forces exerted by the flexure members 72 and 75 are in a horizontal plane. Gravity forces constitute thrust forces on the axle and bearings. There are available bearings that can absorb all these forces without allowing any vertical axle motion. In this case, the carriage 16 could be constructed with three wheel assemblies. The use of four such assemblies, as shown in the FIGURES, enables me to use less expensive bearings which have some vertical play. In prior positioners, each wheel position includes a pair of wheels. One set of wheels provide stability in the horizontal plane while the other set provides stability in the vertical plane. With my arrangement, one set of wheel assemblies provides support in both planes.

These features are enhanced by use of preferred materials of the various parts. We have obtained excellent wear characteristics with a housing 17 constructed of easily machined aluminum, the ways 52 and 53 being surfaced hardened by plating them with nickel. The wheels are composed of a polyimide such as the material marketed by E. I. duPont under the trade designation "Vespel". Decreased wear, in turn, contributes to long-lasting maintenance of the desired vertical and lateral head position.

The construction described above faciliates replacement of the positioner 20 (FIG. 1) in the field. Specifically, locating pins and associated machined locating holes can be positioned with sufficient accuracy to locate any positioner properly for operation in any disk memory. Hence, the positioners themselves are interchangeable without alignment, except for head alignment. Moreover, the positioner is easily constructed so that carriages are interchangeable. This means a serviceman can replace a carriage in the field by removing the positioner and replacing the carriage. Then he aligns the moving element 51 in the position transducer to be sure it is properly located. After this, he merely replaces the positioner and aligns both heads. Both these alignment steps are readily performed in the field.

It will be obvious that there are many variations which can be made to the structure specifically shown in the accompanying drawings. Different frame configurations can be constructed and still obtain the advantages by utilizing both the integral nature of the moving carriage structure and the relative location of the center of gravity. Therefore, it is an object of the appended claims to cover all such modifications and variations as come within the true spirit and scope of this invention.

What I claim as new and desire to secure by Letters Patent of the United States is:

1. In a rotating disk memory including a disk, means for rotating the disk and support means for the rotating means, the improvement of means for writing data onto and reading data from the disk, said means comprising:
  A. a carriage adapted for linear motion along an axis, said carriage including a central frame unit and, connected to opposite ends thereof, a reading and writing head unit and a coil unit, all said units being formed integrally along the axis with said head unit being operatively associated with the disk,
  B. an integral housing mounted to the support means adjacent the disk, said housing having guides parallel to the axis for confining carriage motion, and
  C. said carriage additionally including coplanar engaging means for coacting with said guides and supporting said carriage for linear motion along the axis, said reading and writing head unit and said coil unit each having portions extending above and below the plane of said coplanar engaging means, the carriage center of gravity thereby being midway between said guides and coplanar with said engaging means.

2. In a rotating disk memory as recited in claim 1,
  A. said coil unit comprising an open ended electrical coil, and
  B. said housing including magnetic means defining an air gap at an end opposite from the disk, said coil unit passing through said air gap.

3. In a rotating magnetic disk memory as recited in claim 2,

A. said guides comprising a pair of parallel spaced ways lying in a horizontal plane, and B. said engaging means including a plurality of vertical wheel axles for supporting wheels in the horizontal plane.

4. In a rotating magnetic disk memory as recited in claim 3

A. said carriage central frame comprising an open frame assembly with a plurality of struts supporting a horizontal plate, said reading and writing head unit being cantilevered from said plate, said carriage additionally comprising a first position transducer member mounted thereto, and B. said housing additionally comprising a stationary position transducer member in operative association with said first transducer member.

5. In a rotating magnetic disk memory as recited in claim 4, said carriage wheels being composed of a polyimide material and said housing ways being surface hardened.

6. In a rotating disk memory as recited in claim 4, said housing additionally including inner and outer stop means connected thereto for limiting carriage travel.

7. In a rotating magnetic disk memory as recited in claim 4, said support means locating said housing with respect to said disk with the longitudinal axis being parallel to but offset form the radius of the disk.

8. A rotating disk memory comprising:

A. a supporting frame,

B. a horizontally oriented, rotatable disk,

C. a motor means mounted to said support frame for rotating said disk about a vertical axis, D. a reading head and a writing head, E. a carriage including a central frame member adapted for linear motion along an axis, means for supporting the reading and writing heads connected to one end of said frame member and a coil unit connected to the other end of said central frame member, said support means, central frame member and coil unit being located along the axis, and F. a housing connected to said support means adjacent the disk, said housing having coplanar guides parallel to the axis for confining carriage motion, said carriage additionally including a plurality of wheels mounted to said central frame member for riding in said guides, said supporting means for said reading and writing heads and said coil unit each having portions thereof extending above and below a plane defined by said coplanar guides, the carriage center of gravity thereby being located midway between said guides and coplanar with said guides.

9. A rotating disk unit as recited in claim 8 wherein said carriage central frame comprises an annular support connected to said armature, a plate connected to said supporting means for said reading and writing head, and a plurality of struts integrally formed with said plate and armature support and spacing said plate in armature support, said plate including means for supporting four wheels in a generally rectangular configuration and in a horizontal plane.

10. A rotating disk memory as recited in claim 9 wherein wheel support means for a pair of wheels riding in one guide means include spring means for exerting a horizontal force on said wheels to thereby force said wheels into guides.

* * * * *